(12) United States Patent
Frank

(10) Patent No.: US 6,709,044 B2
(45) Date of Patent: Mar. 23, 2004

(54) BUMPER FOR A VEHICLE

(75) Inventor: Simon Frank, Tengen (DE)

(73) Assignee: Alcan Technology & Management Ltd. (CH)

(*) Notice: Subject to any disclaimer, the term of this patent is extended or adjusted under 35 U.S.C. 154(b) by 0 days.

(21) Appl. No.: 10/379,881

(22) Filed: Mar. 4, 2003

(65) Prior Publication Data
US 2003/0164619 A1 Sep. 4, 2003

(30) Foreign Application Priority Data

Mar. 4, 2002 (DE) .................... 202 03 374 U
Oct. 24, 2002 (DE) .................... 202 16 489 U

(51) Int. Cl.⁷ ............................. B60R 19/02
(52) U.S. Cl. .................... 296/102; 296/120
(58) Field of Search ............. 293/102, 120; 296/146.6

(56) References Cited

U.S. PATENT DOCUMENTS

| 5,997,058 A | 12/1999 | Pedersen |
| 6,343,820 B1 | 2/2002 | Pedersen |
| 6,361,092 B1 * | 3/2002 | Eagle et al. ............. 293/102 |

FOREIGN PATENT DOCUMENTS

| CH | 689638 | 7/1999 |
| DE | 43 06 824 | 9/1994 |
| EP | 0 467 829 | 1/1992 |

OTHER PUBLICATIONS

Patent Abstracts of Japan, vol. 1999, No. 11, Sep. 30, 1999 & JP 11170935 A (Nippon Steel Corp), Jun. 29, 1999 (see Abstract and Figures 1 and 2).

* cited by examiner

Primary Examiner—Joseph D. Pape
(74) Attorney, Agent, or Firm—Ostrolenk, Faber, Gerb & Soffen, LLP

(57) ABSTRACT

A bumper for a vehicle having an extruded light metal alloy hollow section with section walls in the form of a compressive strut and a tensile strut which are spaced apart and a pair of transverse walls joining them. In the interior of the hollow section there is a reinforcing bead provided on at least one of the transverse walls and/or on one of the section walls joining them. This bead is situated in at least one corner region between a transverse wall and the section wall joining them, the latter of which may preferably be a section inner wall facing the vehicle.

11 Claims, 1 Drawing Sheet

BUMPER FOR A VEHICLE

BACKGROUND OF THE INVENTION

The present invention relates to a bumper for a vehicle having an extruded light metal alloy hollow section comprising section walls in the form of a compressive strut and a tensile strut which are spaced apart and a pair of transverse walls joining them.

Such a bumper is described in CH 689 638 A5. In that bumper at least one transverse strut is provided between the transverse walls and joins the two section walls to each other such that the hollow section is subdivided into chambers. Further, a vertical strut is provided between the section walls joining the two transverse walls to each other, and defines a primary deformation part with chambers bordering on the compressive strut and a secondary deformation part with chambers bordering on the tensile strut of the hollow section. This design should provide a high degree of stability in shape along with adequate capacity for compensation of deformation energy on impact.

SUMMARY OF THE INVENTION

With the knowledge of this sate of the art the object of the present invention is to provide an improvement in the strength ratios also when transverse walls of the kind described are not present or only to a small extent. In addition the strength of such a hollow section should also be improved if holes are provided in one or the other transverse or section walls—for example for attaching screws or similar connecting elements.

In accordance with the invention a reinforcing bead is provided in the interior of the section on at least one of the transverse walls and/or on a section wall joined to it. According to another feature of the invention, the reinforcing bead is situated in the corner region between the transverse walls and at least one of the section walls connected to them, this preferably in the adjacent corner regions between the transverse walls and the inner section wall facing the vehicle.

As a result, deformation forces experienced on impact or the like are taken up and re-directed in the direction transverse to the section walls. Due to such a jump in stress, the strength of the bumper is greatly increased.

The above mentioned jump in stress may also be reinforced by providing in the outer face of the reinforcing bead a longitudinal groove which runs parallel to the neighbouring section wall and is delimited a distance from it by a longitudinal rib which is part of the reinforcing bead.

It has been found favorable for the recesses or longitudinal grooves or the longitudinal ribs of facing reinforcing beads, which are aligned with each other on a section wall, to lie as in a common plane. Further, in accordance with the invention, the longitudinal ribs should be shaped such that it defines an outer face of the reinforcing bead which runs approximately parallel to the section wall which also delimits the longitudinal groove, i.e. forms a part of this. Furthermore, the breadth of the longitudinal groove should preferably correspond approximately to the breadth of the longitudinal rib and the depth of the longitudinal groove should be about the same as its own breadth. In addition, it is also foreseen for the magnitude of the depth of the longitudinal groove to be one third to one half of the height of the reinforcing bead. The thickness of the section wall should thereby correspond at least to the breadth of the neighbouring longitudinal groove.

The result is a hollow section the resistance of which to deformation forces under collision conditions or the like is greater than that of comparable sections without the corner designed according to the invention.

BRIEF DESCRIPTION OF THE DRAWINGS

Further advantages, features and details of the invention are revealed in the following description of a preferred exemplified embodiment and with the aid of the drawing which shows in FIG. 1: a perspective view of part of a hollow section for use as a bumper.

DETAILED DESCRIPTION OF THE PREFERRED EMBODIMENTS

Figures 1, 2:
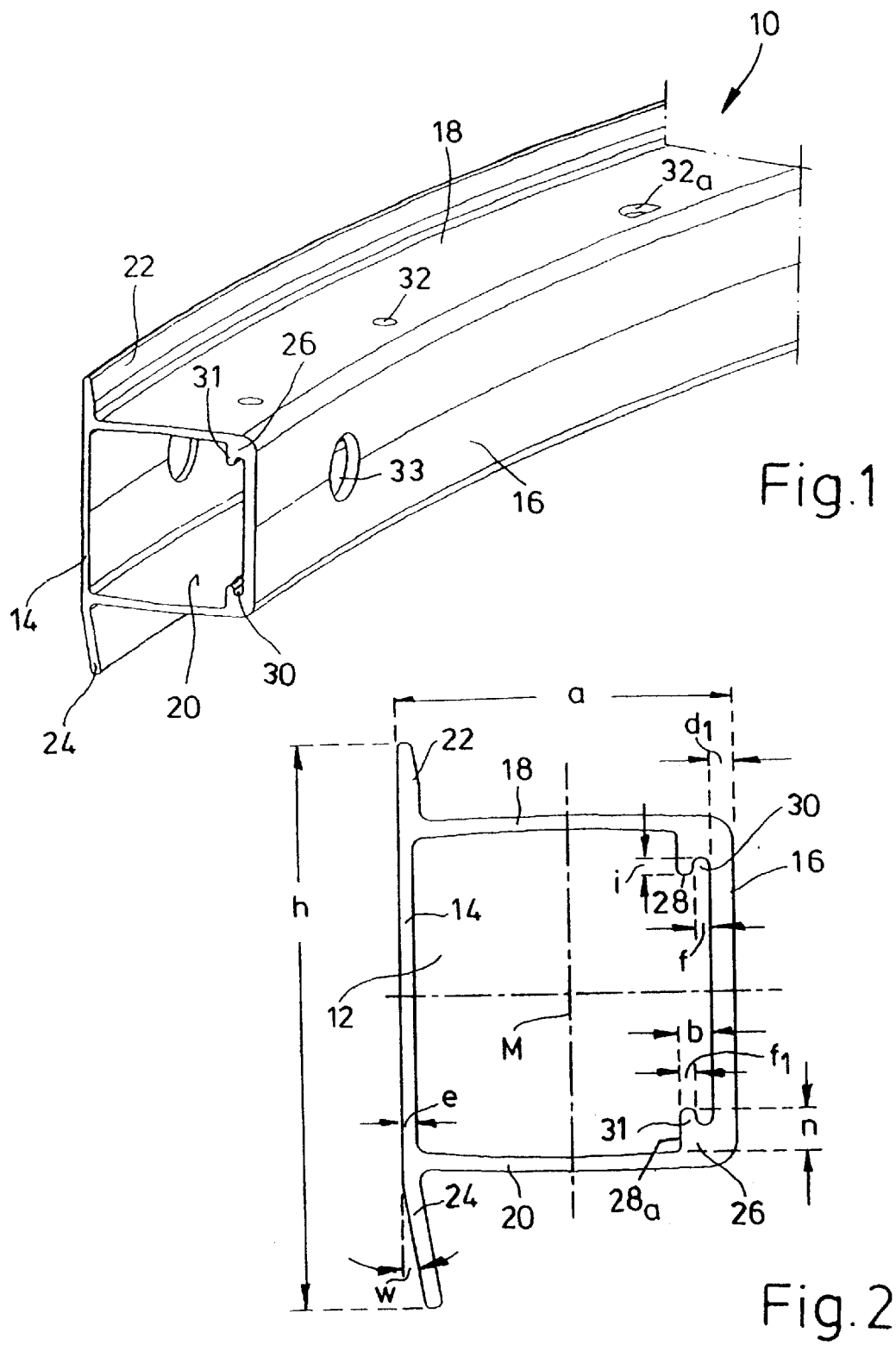
FIG. 2: an enlarged end view of the hollow section shown in FIG. 1.

An extruded hollow section 10 made of an aluminium alloy for use as a bumper on a private car—for reason of clarity not shown here—is almost quadratic in cross-section and has an outer breadth a e.g. of 64 mm. An outer section wall 14—on the left in the drawing—forms the compressive strut and, having a thickness e of 3 mm, is thinner than the parallel inner section wall 16 having a thickness $d_1$ of 4 mm. Beyond a pair of integral transverse walls, which form a top section wall 18 and a base section wall 20, the outer section wall 14 extends to an overall height h—in this case—of 90 mm forming a top strut 22 and a base strut 24 which is inclined to the central axis M at an acute angle w.

Provided in the section interior 12 in each of the corners of the hollow section 10—formed by the top section wall 18 and the base section wall 20 along with the inner section wall 16 acting as tensile strut—is an integral reinforcing bead 26 of breadth b of 6 mm and height n of 7 mm. The outer faces 28 or $28_a$ run approximately parallel to the neighbouring section front or inner wall 16 and to the adjoining top section wall 18 or base section wall 20. By providing a recess in the form of a longitudinal groove 30 of breadth f of 3 mm and depth i of the same dimension in the reinforcing bead 26 and parallel to the inner section wall 16, longitudinal ribs 31 of breadth $f_1$ and height i of the are produced in correspondence with the longitudinal groove 30. Both of the longitudinal grooves 30 provided in the outer faces 28 lie on a common plane, i.e. are in line with each other.

By means of the reinforcing beads 26 the strength of the hollow section is greatly increased as deformation forces arising e.g. on impact and entering the vehicle approximately in the direction of the longitudinal axis of the vehicle are diverted transverse to the section walls 14, 16 before reaching the section inner wall 16 by the reinforcing beads 26. For example, it is now possible to introduce holes 33 in the section outer and inner walls 14, 16 resp. without reducing the strength of the hollow section 10.

Thus, while there have been shown and described and pointed out fundamental novel features of the present invention as applied to a preferred embodiment thereof, it will be understood that various omissions and substitutions and changes in the form and details of the devices illustrated, and in their operation, may be made by those skilled in the art without departing from the spirit of the present invention. For example, it is expressly intended that all combinations of those elements and/or method steps which perform substantially the same function in substantially the same way to achieve the same results are within the scope of the invention. Substitutions of elements from one described embodiment to another are also fully intended and contemplated. It is also to be understood that the drawings are not necessarily drawn to scale but that they are merely conceptual in nature. It is the intention, therefore, to be limited only as indicated by the scope of the claims appended hereto.

I claim:

1. A bumper for a vehicle, comprising an extruded light metal alloy hollow section having section walls formed as a compressive strut and a tensile strut which are spaced apart, a pair of transverse walls joining the section walls, and an integral reinforcing bead provided at least one of on one of the transverse walls and on a section wall joined to the transverse wall, the reinforcing bead being situated in a corner region between a transverse wall and the section wall joined to the transverse wall, the reinforcing bead having a longitudinal groove-shaped recess running substantially parallel to a neighbouring section wall.

2. A bumper according to claim 1, wherein the reinforcing bead is situated in at least one corner region between the transverse walls and an inner section wall which is joined to the transverse walls so as to face the vehicle and forms two corner regions between the transverse walls and the inner section wall.

3. A bumper according to claim 2, wherein the reinforcing bead is situated in two corner regions.

4. A bumper according to claim 1, wherein the recess is delimited a distance (f) from the section wall by a longitudinal rib.

5. A bumper according to claim 1, wherein two reinforcing beads are provided on a section wall so as to face one another, the recesses of the facing reinforcing beads on a section wall are aligned with each other.

6. A bumper according to claim 4, wherein two reinforcing beads are provided on a section wall so as to face one another, the longitudinal ribs of the facing reinforcing beads on a section wall are aligned with each other.

7. A bumper according to claim 4, wherein the longitudinal rib defines an outer face of the reinforcing bead which runs substantially parallel to the section wall which also delimits the longitudinal groove.

8. A bumper according to claim 4, wherein the longitudinal groove has a breadth that corresponds substantially to a breadth of the longitudinal rib.

9. A bumper according to claim 8, wherein the longitudinal groove has a depth that corresponds substantially to its breadth.

10. A bumper according to claim 9, wherein the depth of the longitudinal groove corresponds in size to substantially one third to one half of a height of the reinforcing bead.

11. A bumper according to claim 8, wherein the section wall has a thickness that corresponds at least to the breadth of the neighbouring longitudinal groove.

* * * * *